US006219531B1

United States Patent
Roberts et al.

(10) Patent No.: US 6,219,531 B1
(45) Date of Patent: Apr. 17, 2001

(54) ARCHITECTURE AND FREQUENCY PLAN FOR A UHF PORTABLE RADIO

(75) Inventors: Gerald E. Roberts, Lynchburg; John R. Lane, Forest, both of VA (US); John R. Poirier, Gilbertsville, PA (US); Robert B. Sanders, Pamplin, VA (US); William P. Overstreet, Roanoke, VA (US); Johannes J. Vandegraaf, Lynchburg, VA (US); Jeff Johnson; David Bing, both of Forest, VA (US); Fulvio Bonecchi, Menlo Park, CA (US)

(73) Assignee: Ericsson Inc., Lynchburg, VA (US)

( * ) Notice: Subject to any disclaimer, the term of this patent is extended or adjusted under 35 U.S.C. 154(b) by 0 days.

(21) Appl. No.: 09/148,310

(22) Filed: Sep. 4, 1998

(51) Int. Cl.$^7$ ........................................................ H04B 1/38

(52) U.S. Cl. .................................. 455/73; 455/76; 455/86

(58) Field of Search .................................... 455/73, 76, 86, 455/82, 18, 119, 131, 205, 296, 75, 302, 303, 310, 311, 259, 260; 370/276; 331/11, 16

(56) References Cited

U.S. PATENT DOCUMENTS

| | | | |
|---|---|---|---|
| 3,641,434 | * 2/1972 | Yates et al. ............................. | 455/76 |
| 3,676,794 | * 7/1972 | Bidell et al. ............................ | 331/11 |
| 3,694,766 | * 9/1972 | Boelke .................................... | 331/11 |
| 4,031,469 | * 6/1977 | Johnson ............................. | 455/226.4 |
| 4,035,727 | * 7/1977 | Ishii ....................................... | 455/119 |
| 4,086,545 | * 4/1978 | Teshirogi ............................... | 331/16 |
| 4,633,511 | * 12/1986 | Koga et al. ............................. | 455/86 |
| 5,126,694 | * 6/1992 | Montress et al. ....................... | 331/18 |
| 5,235,240 | 8/1993 | Morita et al. . | |
| 5,436,523 | 7/1995 | Staudte . | |
| 5,614,019 | * 3/1997 | Vichr et al. ............................ | 117/84 |
| 5,802,463 | * 9/1998 | Zuckerman ........................... | 455/208 |
| 6,002,920 | * 12/1999 | Consolazio et al. ................... | 455/82 |
| 6,029,052 | * 2/2000 | Isberg et al. .......................... | 455/131 |

OTHER PUBLICATIONS

M. Berte, "Acoustic Bulk Wave Resonators and Filters Operating in the Fundamental Mode at Frequencies Greater than 100 MHz," *Proceedings of the 31st Annual Frequency Control Symposium*, 1977, pp. 122–125.

J.R. Hunt & R.C. Smythe, "Chemically Milled VHF and UHF AT–Cut Resonators," *Proceedings of 39th Annual Frequency Control Symposium*, 1985, pp. 292–300.

J. Brauge, M. Fragmeai & J.P. Aubry, "Monolithic Filters Using Ion Etched Fundamental Mode Resonators Between 60 and 100 MHz," *Proceedings of the 39th Frequency Control Symposium*, 1985, pp. 504–512.

F.M. Stern & J. Dowsett, "The Fabrication of High Frequency Fundamental Crystals By Plasma Etching," *Proceedings of 43rd Annual Frequency Control Symposium*, 1989, pp. 634–639.

O. Ishii, T. Morita, T. Saito, & Y. Nalazawa, High Frequency Fundamental Resonators and Filters Fabricated by Batch Process Using Chemical Etching, *Proceedings of the 1995 IEEE International Frequency Control Symposium*, 1995, pp. 818–826.

(List continued on next page.)

*Primary Examiner*—Nay Maung
*Assistant Examiner*—Sonny Trinh
(74) *Attorney, Agent, or Firm*—Nixon & Vanderhye P.C.

(57) ABSTRACT

An architecture and frequency plan for a wideband UHF radio minimizing spurious output signal emissions uses a low value for the ratio of the maximum RF operating frequency to the (first) intermediate frequency (IF) in the radio, as part of its internal superheterodyne conversion process. A minimum value or a value sufficiently close to the minimum value of this ratio allows the radio design to be optimized to reduce spurious outputs and the effects of inherently present major harmonics. These and other advantages and features permit a radio design to be realized in a cost effective manner for an array of stringent performance specifications including low spurious output emissions.

21 Claims, 5 Drawing Sheets

OTHER PUBLICATIONS

O. Ishii, T. Shibata & T. Ohshima, "High Frequency Fundamental VCXO for SDH System," *Proceedings of the 1996 IEEE International Frequency Control Symposium*, 1996, pp. 714–721.

O. Ishii, H. Kanno, H. Owata, & K. Fujita, "Miniaturized High Frequency Fundamental MCF for IF Filters in Mobile Radio Systems," *Proceedings of the 1997 IEEE International Control Symposium*, 1997, pp. 731–736.

* cited by examiner

ARCHITECTURE AND FREQUENCY PLAN FOR A UHF PORTABLE RADIO

FIELD OF THE INVENTION

This invention relates to radio transceivers, and more particularly to a new architecture and frequency plan for a portable UHF (ultra high frequency) radio transceiver. Still more particularly, the invention relates to systems and methods for providing cost-effective, miniaturized UHF radio circuitry that meets various performance specifications including stringent spurious signal output limitations.

BACKGROUND AND SUMMARY OF THE INVENTION

Ultra High Frequency (UHF) land mobile radio applications cover a wide frequency range (for example, nominally 380 MHz to 512 MHz) and a wide corresponding percentage bandwidth (for example, as much as 30%). To reduce cost and complexity and to better serve the customer base, it is desirable to serve this wide UHF frequency range with the fewest possible different models of UHF radios. This means that each different radio model needs to cover a relatively large part of the UHF band—and thus a wide frequency range. For example, it would be desirable to develop a wideband UHF radio that could cover a full bandsplit (i.e., 403–470 MHz). Most prior high performance UHF radios have covered only about half this frequency span.

One problem in designing such wideband UHF radios is the need to minimize spurious signal content. Spurious signals are easier to eliminate in narrowband radios because narrow band radios can include highly selective narrow band filters. Such narrowband filters can be used to filter out all but the narrow range of desired radio operating frequencies. This reduces the number of spurious signals generated within the radio that can reach the antenna where they can be radiated and cause interference with other radio services and equipment. Since a wideband UHF radio must operate over a relatively wide band of frequencies, it is generally not possible to use such highly selective narrowband filters. This increases the likelihood that the radio will conduct undesirable, potentially interfering spurious signals to its antenna.

To minimize cost and size while maintaining flexibility and performance, a portable radio in the UHF band 403–470 MHz should preferably use a superheterodyne double conversion receiver and transmitter both of which are fed by a common synthesizer controlled first local oscillator and a common second local oscillator that is locked to the synthesizer. This particular architecture has advantages in terms of selectivity, sensitivity, and cost, but it has the potential problem that the second local oscillator, and/or its associated reference oscillator can generate harmonics that fall within the radio's wide band operating range.

Lowering spurious output signals is important not only for good engineering, but also to meet strict regulatory requirements imposed by various governments. In the United States, regulations of the Federal Communications Commission forbid radios from emitting more than a certain maximum amount of spurious signal content. In Europe, where many UHF radios are deployed, regulations such as ETSI are especially stringent in their requirements to minimize conducted spurious signal output. Meeting these low spurious signal output requirements presents a significant challenge to the radio designer.

We have discovered a new and improved architecture and frequency plan for a wideband UHF radio that minimizes spurious output signal emissions.

In accordance with one aspect provided by this invention, we use a low value for the ratio of the maximum RF operating frequency value to the (first) intermediate frequency (IF) used by the radio as part of its internal superheterodyne conversion process. We have discovered that if the minimum value or a value sufficiently close to the minimum value of this ratio is used, then the radio design can be optimized based on minimizing spurious outputs and the effects of inherently present major harmonics.

In more detail, we have discovered that using a relatively high second local oscillator frequency (e.g., ~125 MHz) allows us to place the inherent third and fourth harmonics of this local oscillator frequency (e.g., 375 MHz and 500 MHz, respectively) on either side of the desired UHF radio coverage band (e.g., 403 MHz to 470 MHz)—leaving sufficient frequency spacing between these harmonics and the radio passband such that wideband transmitter output frequency filters can suppress the harmonics to acceptably low levels.

The second local oscillator is not the only part of the radio that can cause spurious outputs. In accordance with another aspect provided by the present invention, we have determined that the reference oscillator used to lock the synthesizers often generates spurious signals which can cause major problems in the radio. For example, such spurious signals can interfere with received signals and can also induce the transmitter to radiate and/or transmit unwanted signals. We have found that this is particularly true if a harmonic of the reference frequency is reinforced by being close to the second local oscillator frequency and/or close to a harmonic of the second local oscillator frequency (see, e.g., FIG. 2). We have discovered that we can optimize the second local oscillator frequency to minimize such spurious outputs that may be caused by harmonics of the reference oscillator mixing with harmonics of the second local oscillator.

In accordance with this aspect of the invention, we have discovered that if we carefully optimize the second local oscillator frequency relative to the reference frequency, we can be assured as to where the worst harmonic combination of these two signal contents will occur. In accordance with one preferred example embodiment of our invention, we have placed the second local oscillator exactly between the harmonics of the reference oscillator. This allows certain higher order harmonics of the reference oscillator to exactly coincide with certain harmonics of the second local oscillator while ensuring that none of the reference oscillator's lower order harmonics line up with the second local oscillator harmonics—so that all reference oscillator harmonics of significant amplitude will also be outside of the radio operating band and so that the potential of harmful products resulting from reference oscillator harmonics mixing with second local oscillator harmonics will also be minimized. While this technique does not, of course, eliminate all reference oscillator harmonics within the radio passband, it ensures that only higher order harmonics (which are lower in amplitude and thus inherently well suppressed) fall within the passband and also reduces the number of mixer products that fall within that passband.

In accordance with yet another aspect provided by this invention, the relatively high second local oscillator frequency (which is used for both transmit and receive) provides a relatively high (e.g., ~125 MHz) receiver first intermediate frequency (IF). First IF filtering must be highly selective such that when used with the appropriate $2^{nd}$ IF filters, the combination eliminates adjacent channel interference and intermodulation from other channels just 12.5 to 25 kHz away from a selected operating frequency. We have discovered that a fundamental monolithic crystal filter can be used to provide intermediate frequency filtering at such high intermediate frequencies to meet selectivity, insertion loss, and intermodulation requirements. In accordance with this aspect of the invention, a fundamental crystal IF filter can be constructed based on a four-pole design in two ceramic flat packs. This type of IF crystal filter uniquely addresses the size, cost, ease of integration and manufacturability constraints that are imposed by portable radio design.

In accordance with a further aspect provided by the present invention, we have discovered that we can generate a relatively high (e.g., ~125 MHz) second local oscillator signal with extremely low phase noise by using a fundamental mode crystal such as a high frequency inverted mesa crystal. The lowest noise performance is achieved by a fundamental mode crystal as opposed to an overtone oscillator crystal because of the fundamental mode crystal's lower resistance. Furthermore, the fundamental crystal has other advantages such as better trim range. In accordance with this aspect of the present invention, we have provided a fundamental mode inverted mesa oscillator crystal for production that can generate a relatively high second local oscillator signal (e.g., ~125 MHz) which produces exceptionally low phase noise.

The following is a non-exhaustive list of additional features and/or advantages provided by example preferred embodiments of present invention:

Novel process for optimizing the frequency plan of a UHF portable radio resulting in significant advantages for making a realizable radio in a cost effective manner for the array of specifications and requirements that must be satisfied;

New advantageous design for a wideband 403–470 MHz UHF portable radio;

A process for meeting stringent European (ETSI) spurious emission requirements to minimize spurious transmitter output levels and receiver spurs;

Advantageous novel use of a high frequency crystal filter and high frequency crystal oscillator;

Novel procedure for minimizing major synthesizer spurious signals which would fall in the RF band—thereby eliminating the need for additional circuitry to attenuate these spurious signals;

Eases the requirements on phase noise of the first synthesizer/local oscillator—reducing radio complexity and cost;

Provides a procedure for determining whether the front end RF image filter can be realized using low cost small standard LC elements (e.g., ceramic chip inductors and capacitors) instead of requiring more expensive SAW and/or ceramic filters;

Harmonics of the second local oscillator frequency can be optimally placed out of the RF band where they can be conveniently filtered, and in-band products are of a high order and thus are inherently well-suppressed;

High first local oscillator frequency places the first image sufficiently far away from the RF passband to allow use of lumped element filters in the RF section (such lumped element filters are low cost, small in size, and provide optimal bandwidth for a wideband UHF radio);

Minimizes the major spurious outputs caused by the harmonics from the synthesizer and the vctcxo reference oscillator, thereby simplifying the receiver and transmitter filtering.

A receive IF fundamental monolithic crystal filter with low insertion loss designed and built at ~125 MHz to satisfy selectivity, insertion loss and intermodulation requirements;

A second LO for receive which is common to transmit and which can achieve extremely low phase noise by using a fundamental mode crystal;

The phase noise of the second local oscillator and the high selectivity of the first and second receive IF filters enable nearly all adjacent channel and intermodulation rejection requirements—meaning less stringent requirements—to be allocated to the phase noise performance of the first local oscillator (because the overall phase noise results from a combination of the phase noise of the first local oscillator phase noise and the second local oscillator phase noise, we can tolerate much higher first local oscillator phase noise—in order for example to achieve fast synthesizer settling time at lower cost—and still achieve acceptably low overall phase noise performance because of the $2^{nd}$ local oscillator's extremely low phase noise);

Frequency plan places the 403–470 MHz transmit band optimally between the third and fourth harmonics of a 124.8 MHz transmit local oscillator frequency so that these harmonic spurs can be filtered effectively;

In-band transmit spurious levels are minimized, being higher-order (thus lower amplitude) spurs generated in the transmit modulator;

The receiver first IF frequency of 125.25 MHz pushes the first image band out to 653.5–720.5 MHz, enabling image rejection filtering with tunable lumped element filtering instead of the usual bulky ceramic or helical image filters;

A fundamental mode 125.25 MHz 4-pole crystal is used for second image and intermodulation filtering while integrating easily with surrounding IF circuitry;

The second local oscillator frequency is fixed at 124.8 MHz and is stabilized by a fundamental 124.8 MHz crystal resonator, which gives extremely low second local oscillator phase noise;

To enable cost-effective dual mode operation in 25 kHz and 12.5 kHz channel-spaced systems, final selectivity filtering at the second IF can be comprised of a permanently connected cascade of wider band filters for 25 kHz channelization, and a narrow band ceramic filter switched in for 12.5 kHz channelization;

The phase noise and selectivity performance permit nearly all the adjacent channel and intermodulation degradation to be allocated to the phase noise performance of the first local oscillator, where it is most advantageous to compromise phase noise performance;

The frequency plan uses an unusually low RF-to-first-IF frequency ratio of 3.75 compared with typical 800–900 MHz radios with ratios of 10 or so;

High specification operation using available, manufacturable, off-the-shelf components;

Can use the same chassis and board footprint as higher frequency (e.g., 800–900 MHz) portables;

Alternate embodiment can use, before the first mixer for image rejection, a tracking filter which passes particular RF frequency being used and attenuates the half IF frequency and image frequency to maintain unusually low and constant insertion loss over the entire tracking range.

BRIEF DESCRIPTION OF THE DRAWINGS

These and other features and advantages of the present invention may be better and more completely understood by referring to the following detailed description of presently preferred example embodiments in conjunction with the drawings, of which.

DETAILED DESCRIPTION OF PRESENTLY PREFERRED EXAMPLE EMBODIMENTS

Figure 1:
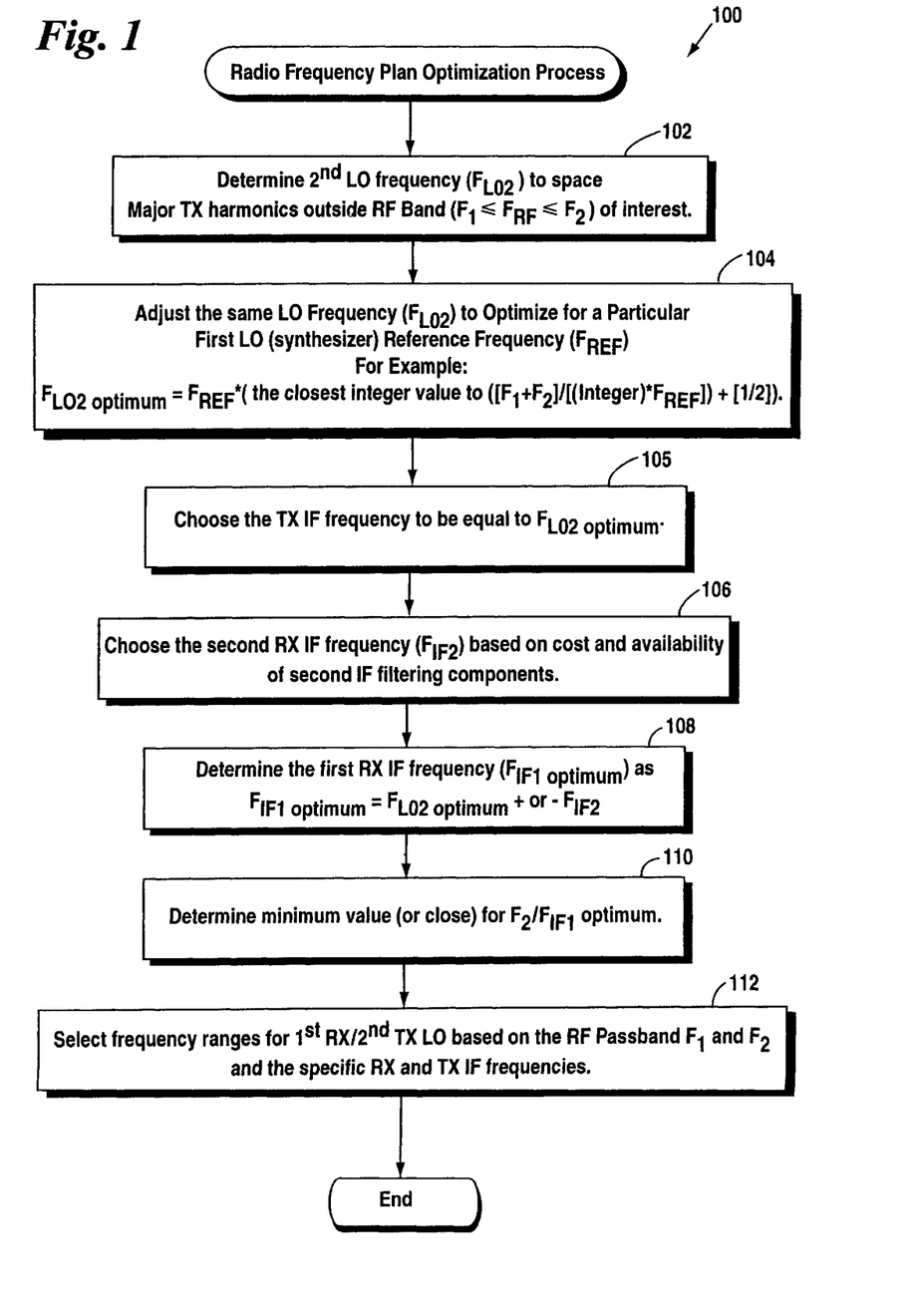
FIG. 1 is an example overall preferred process for planning the frequencies of a double conversion superheterodyne UHF portable transceiver sharing a common, tunable, synthesized first local oscillator and a common, fixed frequency second local oscillator locked to the synthesizer.

FIG. 1 shows a presently preferred example process 100 for developing an optimized frequency plan for a double conversation superheterodyne UHF radio 10. The FIG. 1 process is especially suited for designing portable wideband half-duplex UHF radio transceivers of the type including common first and second local oscillators shared between the transmitter and the receiver. The FIG. 1 process provides a low value for the ratio of the maximum value of usable RF frequency in the UHF band to the IF frequency. We have discovered that if we use the minimum value (or a value sufficiently close to the minimum) of this ratio, then we can optimize the design of a personal or portable radio to minimize radio spurious outputs and the adverse effects of inherently present major harmonics.

The example FIG. 1 process 100 begins by selecting an approximate second local oscillator frequency ($F_{LO2}$) (see FIG. 2, oscillator 54) to space its harmonics away from RF band ($F_1$ to $F_2$) of interest (FIG. 1, block 102). This allows us to optimally determine the frequency of second local oscillator 54 in such a way that its significant harmonics (e.g., the third and fourth harmonics) are equally spaced below the lowest RF frequency (e.g., F=403 MHz in one particular example) and above the highest RF frequency (e.g., $F_2$=470 MHz in one particular example). This means that no harmonics of second local oscillator 54 fall within the RF passband. Using the particular $F_1$, $F_2$ frequencies described above as an example, we have found that in one particular example, the selected local oscillator 54 frequency has a unique value, namely:

$$F_{LO2}=(873/7)\ \text{MHz}=124.7142857\ \text{MHz}.$$

In this example, using this $F_{LO2}$ frequency places the third harmonic at 374.1428571 MHz and the fourth harmonic at 498.8571428 MHz. Thus, these two harmonics are placed symmetrically at 28.857143 MHz from each RF passband edge. The third harmonic is 28.857143 MHz below the lower passband edge of 403 MHz, and the fourth harmonic is 28.857143 MHz above the upper passband edge of 470 MHz. Such spacing is sufficiently large that the third and fourth harmonics can be effectively filtered out using conventional filtering circuits connected between the transmit modulator/up-converter and the transmit power amplifier.

We have also found that the reference ("VCTCXO") oscillator (see oscillator 50 in FIG. 2) used to drive the first local oscillator synthesizer often generates spurious signals which can cause major problems in the receiver with regard to interfering with received signals. Such spurious signals can also cause the transmitter to radiate or transmit unwanted signals. These problems are more acute if a harmonic of the reference oscillator frequency ($F_{ref}$) is reinforced by being close to the second local oscillator frequency ($F_{LO2}$) or to a harmonic of the second local oscillator frequency. Problematic spurious signals can be generated if a harmonic of the second local oscillator frequency ($F_{LO2}$) mixes with a harmonic of the reference frequency ($F_{ref}$) to generate a product (sum or difference frequency) that falls within the radio passband. It is desirable to minimize the occurrence of all such spurious signals having significant amplitude.

The next step in FIG. 1 (block 104) takes these effects into account by optimally adjusting the second local oscillator frequency ($F_{LO2}$) for a particular first local oscillator (synthesizer) reference frequency ($F_{ref}$). For example:

$$F_{LO2\ optimum}=F_{ref}*(\text{the closest integer value to } ([F_1+F_2]/[(X)*F_{ref}])+\tfrac{1}{2}),$$

where X is the integer sum of the two harmonics of interest (X=3+4=7 in this particular example).

$F_{ref}$ is typically conveniently in the range of 10–30 MHz depending on the particular requirements of a particular transceiver. In one particular example, it is convenient to use a reference oscillator frequency of $F_{ref}$=19.2 MHz. In this case, $$(F_{LO2})/(19.2\ \text{MHz})=6.4955357.$$

Therefore, a choice of $$(F_{LO2})/(19.2\ \text{MHz})=6.5$$

would put $F_{LO2\ optimum}$ exactly between the sixth and seventh harmonics of $F_{ref}$=19.2 MHz. The optimal choice of $F_{LO2\ optimum}$ then becomes 124.8 MHz with the second harmonic of 124.8 MHz and the $13^{th}$ harmonic of 19.2 MHz coinciding at 249.6 MHz and the fourth harmonic of 124.8 MHz and the $26^{th}$ harmonic of 19.2 MHz coinciding at 499.2 MHz—both of which fall outside the 403–470 MHz RF passband. Thus, this procedure ensures that none of the low order harmonics of the reference oscillator coincide with the lower order harmonics of the second local oscillator. This tends to minimize the inband spurious caused by the harmonics of the second local oscillator and the synthesizer—particularly those related to the transmitter. This is because the inband products in the transmitter due to the mixing of the harmonics of the reference oscillator output and the harmonics of the reference oscillator output and the second local oscillator output are of high order and thus are inherently well-suppressed. Furthermore, even though FIG. 1 block 104 has slightly adjusted the second local oscillator frequency $F_{LO2}$, the third and fourth harmonics of 124.8 MHz still fall at essentially the same optimal frequencies above and below the RF band and therefore the various advantages described in connection with step 102 are still obtained.

Figure 2:
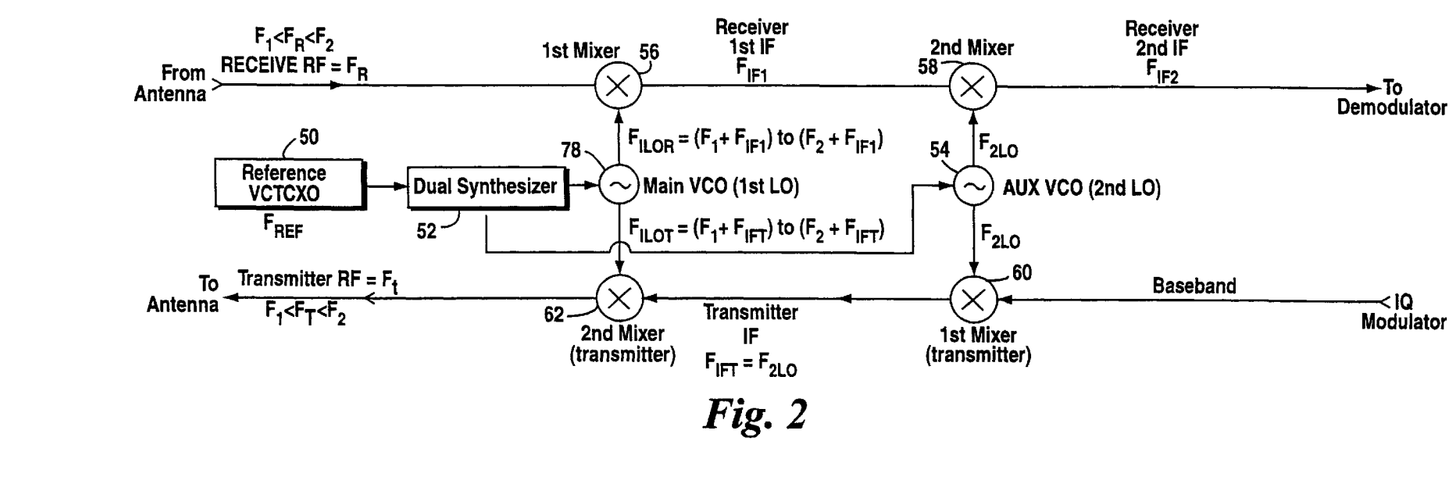
FIG. 2 is a simplified schematic diagram showing an example radio architecture and frequency plan corresponding to the FIG. 1 process.

Since the second local oscillator frequency is fixed in this particular example design for both transmit and receive (see FIG. 2 showing second local oscillator 54 outputting its signal to both the receiver second mixer 58 and the transmitter first mixer 60), this 124.8 MHz second local oscillator can achieve extremely low phase noise by using a fundamental mode crystal. The lowest noise performance is achieved by a fundamental mode crystal as opposed to an overtone oscillator crystal because of the fundamental mode crystal's lower resistance. The fundamental mode crystal also has better trim range. While it might at first appear that it would be difficult to provide a fundamental mode crystal at this high frequency, the second local oscillator frequency in accordance with this example is within a range that can be realized by a crystal oscillator using a high frequency inverted mesa crystal—which produces exceptionally low phase noise when operating in its fundamental mode. As will be explained below, the low phase noise of this second local oscillator allows the first local oscillator to have less stringent phase noise requirements while achieving overall required phase noise performance. This has advantages in terms of enabling a wideband first local oscillator (synthesizer) with lower cost and/or faster setting time, for example.

The next step (FIG. 1, block 106) is to choose a convenient receiver second IF frequency (FIF$_2$) based on cost and availability of second IF filtering components. For example, it is common to use standard off-the-shelf integrated circuits such as Application Specific Integrated Circuits (ASICs) operating at a nominal frequency of about 450 kHz to provide second IF filtering and amplification. The use of such standard components promotes efficiency, reduces cost and increases miniaturization. A second IF of 450 kHz is convenient, but not limiting.

Once the value of $F_{LO2\ optimum}$ obtained, then given the chosen second IF frequency ($F_{IF2}$), the next step (FIG. 1, block 108) is to obtain the optimum first IF frequency ($F_{IF1\ optimum}$) as $$F_{IF1\ optimum} = F_{IF2} + F_{LO2\ optimum}$$

(using a high side first local oscillator—see items 50, 52 in FIG. 2). In this particular example, the resulting first IF frequency is:

$$F_{IF1\ optimum} = 450\ \text{KHz} + 124.8\ \text{MHz} = 125.25\ \text{MHz}.$$

A first IF at this frequency could potentially present a problem in terms of finding a suitable IF filter operable at that frequency with low insertion loss that would satisfy selectivity and intermodulation requirements. A solution presents itself in the form of a fundamental monolithic crystal filter (shown and described in FIG. 5B and associated text below). This fundamental monolithic crystal filter provides acceptable performance in a very small package at low cost.

We can obtain the minimum value of the ratio of the maximum RF frequency to the optimum value of the receiver first IF frequency, $F_{IF1\ optimum}$, under the conditions outlined above (FIG. 1, block 110). In the specific non-limiting case of an RF passband of 403–470 MHz and a second IF of 450 KHz, this minimum value becomes:

$$(F_2/F_{IF1\ optimum}) = 470\ \text{MHz}/(124.8\ \text{MHz} + 450\ \text{KHz}) = 470/125.25 = 3.752495.$$

Thus, the conditions above yield the minimum value of the ratio of the maximum RF frequency to the optimum value of the receiver first IF frequency to achieve optimum placement of the RF frequency band between the third and fourth harmonics of the second local oscillator. Moreover, the natural logarithm of this ratio is proportional to the minimum Q needed to realize an LC receive front end filter for the particular receiver. It is advantageous to use LC filters operating in the RF band in the case of wide RF bandwidths where SAW filters may not have large enough bandwidths and ceramic filters are physically too large. The proportional constant to determine this minimum Q for ceramic chip inductors in the 0805 or the 1008 sizes is about 37.8 using a minimal lead length and lead width type of board layout.

The next step (FIG. 1, block 112) is to select frequency ranges—the first receive LO frequency range is from ($F_1+F_{IF1}$) to ($F_2+F_{IF1}$) and the first transmit LO frequency range from ($F_1+F_{1FT}$) to ($F_2+F_{1FT}$)—of the first local oscillator (FIG. 2, items 50, 52 and 78) to provide coverage of the desired radio RF passband ($F_1$ to $F_2$) of interest. In this particular non-limiting example, the first receive local oscillator (FIG. 2, items 50, 52 and 78) must be able to supply frequencies in the range of 528.25–595.25 MHz to the first mixer to produce a first IF frequency at 125.25 MHz from an incoming signal in the range of 403–470 MHz. A synthesizer (FIG. 2, item 52) providing a range of frequencies 527.8–595.25 would be adequate. In the receiver, the use of a high-side first local oscillator (e.g., in the range of 528.25–595.25 MHz) places the first image in the range of 653.5–720.5 MHz which is far enough away from the RF passband (403–470 MHz) to allow the use of low cost and small sized lumped element filters. This is a major advantage, since ceramic or helical filters are too large and their bandwidth is too narrow for building a portable radio covering the full 403–470 MHz bandpass.

Figure 3:
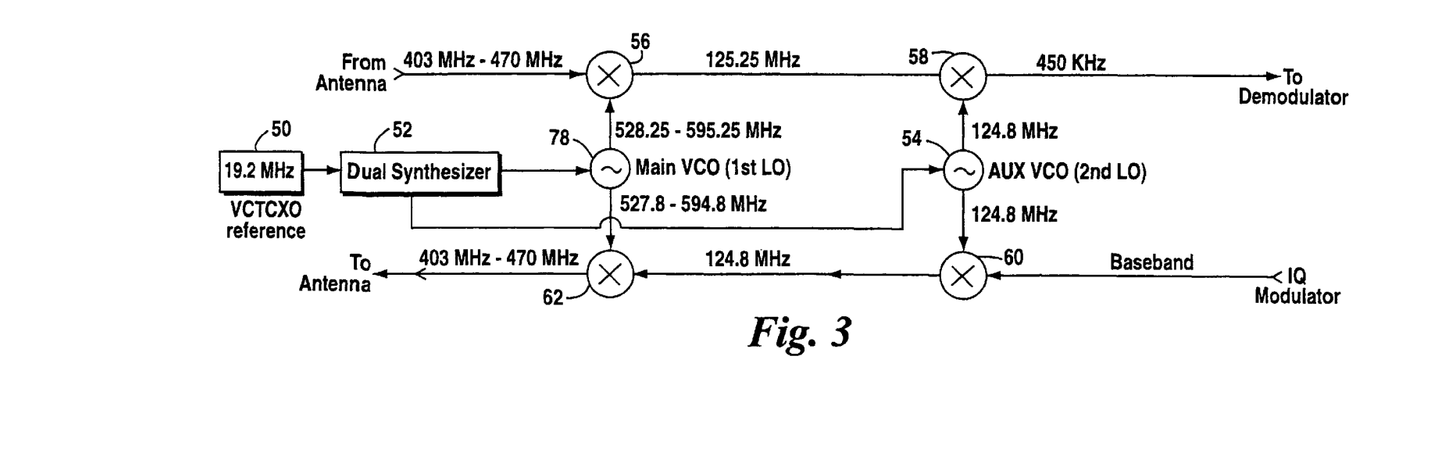
FIG. 3 is a simplified schematic diagram showing an actual example frequency plan developed for a 403–470 MHz portable UHF radio.
Figure 4:
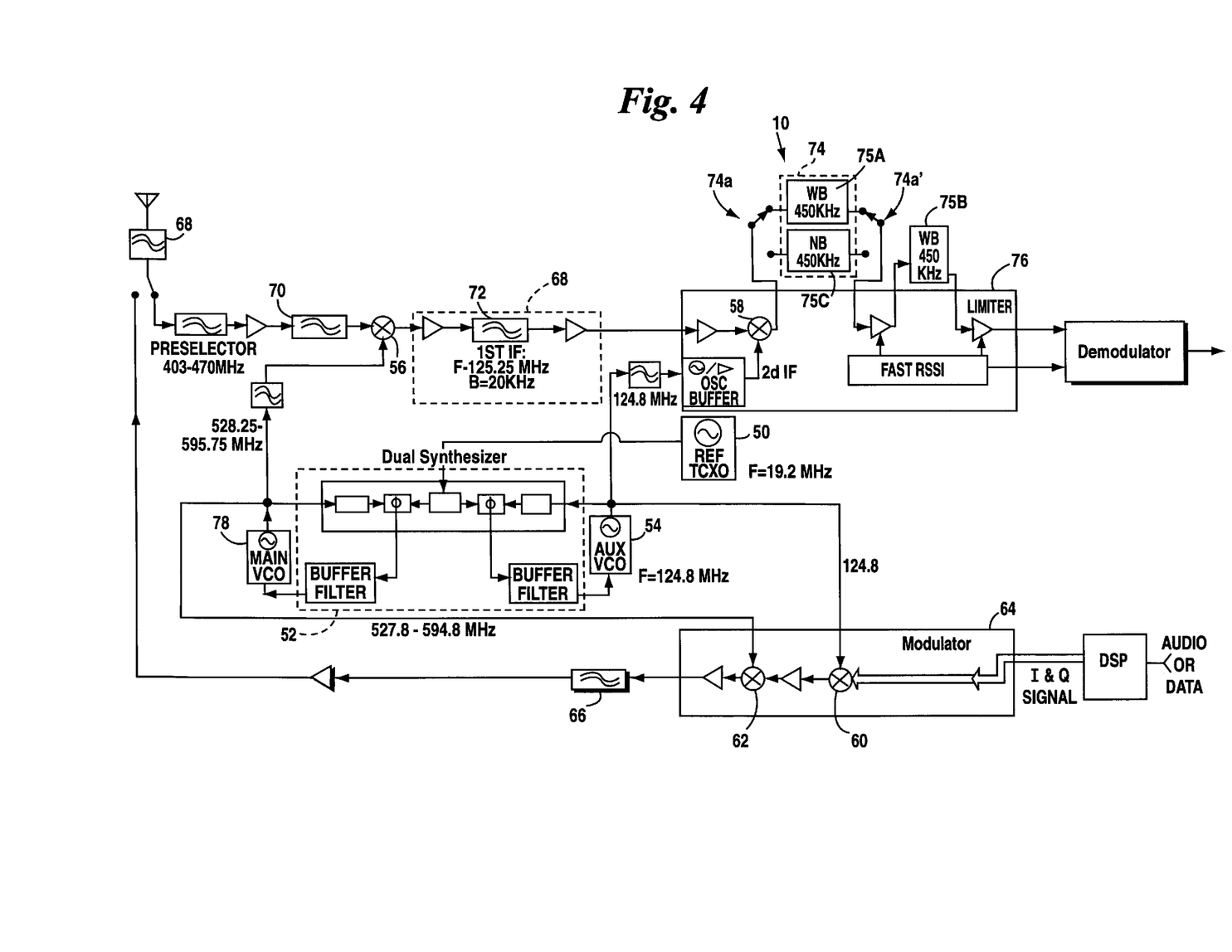
FIG. 4 is a more detailed architecture showing a preferred example embodiment of a 403–470 MHz portable radio using the FIG. 3 frequency plan.

FIG. 3 is an overall non-limiting example frequency plan for a 403–470 MHz portable UHF radio based on the procedures discussed above. FIG. 4 shows an example UHF portable 403–470 MHz radio transceiver 10 designed in accordance with the FIG. 3 frequency plan. As shown in FIG. 4, a 19.2 MHz reference oscillator 50 and synthesizer 52 via the main VCO 78 provide a synthesized 528.25–595.25 MHz first local oscillator signal for receive (see input to receiver first mixer 56) and also act as a 527.8–594.8 MHz local oscillator for transmit (see input to transmit mixer 62). A 124.8 MHz fixed crystal oscillator 54 provides a second local oscillator signal for receive (see input to receiver second mixer 58) as well as a local oscillator signal for the transmit IF (see input to transmitter mixer 60 in cascade with mixer 62). In this particular example, the transmit modulator 64 mixes the radio's first and second local oscillators to generate the 403–470 MHz transmit signal—there being no fixed transmit/receive frequency offset in UHF radios. As discussed above, choosing the local oscillator 54 to have a 124.8 MHz frequency puts its third and fourth harmonics about 25 MHz above and below the transmit band, where further filtering can be done by transmit chain filters 66, 68 (which may be sharp-rejection SAWs if necessary) to achieve conducted spurious compliance. This is an optimum choice of LO frequencies for 403–470 MHz transmission, since besides symmetrical placement of LO harmonics, the in-band products of a 527.8–594.8 MHz/124.8 MHz mixer (60, 62) are of a higher order and thus inherently well-suppressed.

In the receiver, using a high-side first local oscillator 78 places the first image band at 653–720 MHz—far enough away from the 403–470 MHz passband of first IF 68 so that cost and size effective lumped element filters can be used as image filter 70 for image rejection. In typical 800 and 900 MHz radios, narrowband ceramic filters—bulky even at these frequencies—perform preselection and image rejection. At UHF, off-the-shelf ceramics or helicals are too large and narrowband for full 403–470 MHz coverage. A higher image band affords the ability to use lower-Q, tunable lumped filtering. Since such lumped filtering elements are smaller in size, the UHF radio can be designed to physically fit within the same chassis and printed circuit board footprint as higher frequency (800–900 MHz) radios.

In cases where the half IF spurious response falls within the RF passband, different passbands must be switched in and out depending on the RF frequency used. Another method is to use a tracking filter which passes the particular RF frequency being used and attenuates the half IF frequency and the image frequency. A suitable tracking filter is disclosed in U.S. patent application Ser. No. 09/045,701 of Roberts filed Mar. 23, 1998 entitled "A Radio Frequency Tracking Filter" (EUS000863-RPRS; 46-946). This low cost tracking filter maintains an unusually low and constant insertion loss over the entire tracking range.

Despite its advantages, a significant challenge with the 125.25 MHz IF 68 is the narrow filtering required at this fairly high frequency both to reject the second image (900 KHz below 125.25 MHz) and to help with two-tone intermodulation rejection, 25/50 KHz and 50/100 KHz away from the channel. Rather than use a third overtone crystal filter with inherently difficult impedance matching, the preferred example embodiment shown in FIG. 4 employs a four-pole fundamental mode crystal filter 72 to provide excellent rejection and good integrability with the first IF strip 68. Because the second local oscillator frequency is fixed for both transmit and receive, a fundamental mode crystal can also be used in the 124.8 MHz oscillator 54 to achieve extremely low phase noise.

Figure 5A:
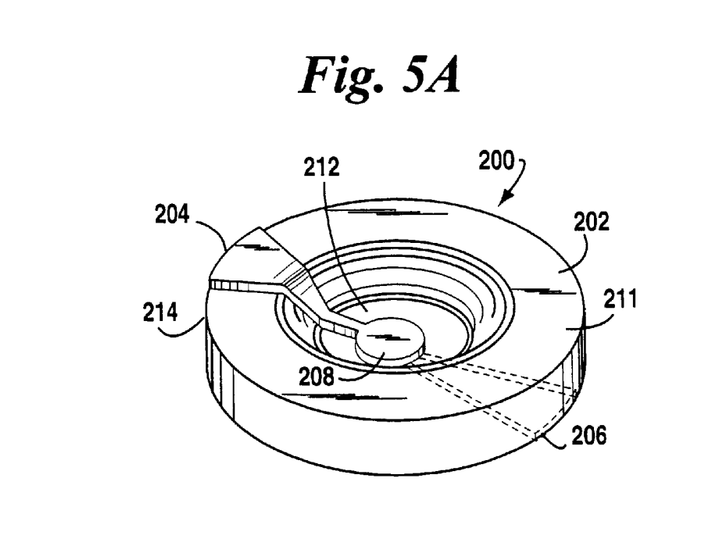
FIGS. 5A and 5B show example single resonator inverted mesa crystals whose fundamental mode operates at high frequencies.
Figure 5B:
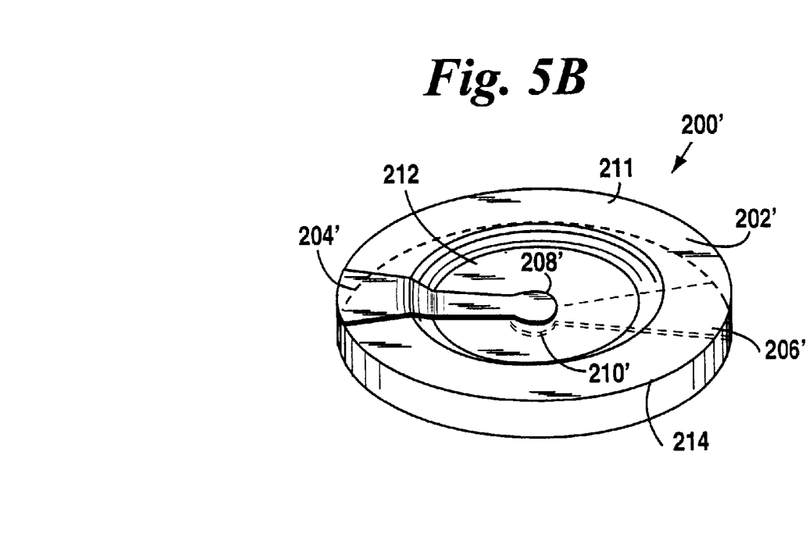

FIGS. 5A and 5B show example inverted mesa crystals 200, 200' for realizing a high frequency fundamental mode crystal second local oscillator 54. Crystal 200 includes an inverted crystal wafer 202 with a single metallic electrode pair 208, 210 on opposite sides of wafer 202. Crystal wafer 202 has an ultra thin region 212. The metallic electrodes 208, 210 of the electrode pair reside on opposite sides of the ultra thin region 212 of wafer 202. Electrode pair 208, 210 and ultra thin region 212 form the resonator of crystal 200. Leads 204, 206 extend from each electrode 208, 210 over a thicker portion 211 of the crystal 200. These leads 204, 206 connect to a holder portion of the crystal package (not shown). Lead electrodes 204, 206 do not have to get larger as they get closer to the edge 214 of wafer 202. The thick portion 211 provides mechanical stability for the ultra thin portion 212. The thickness of the ultra thin portion 212 of the wafer sets the basic frequency of the crystal (in the case of an AT-cut crystal, the thinner the region under the electrode pair the higher the frequency) for a given electrode pair 208, 210— with the particular size and thickness of the elecrode pair allowing fine tuning of the resonant frequency.

Figure 6A:
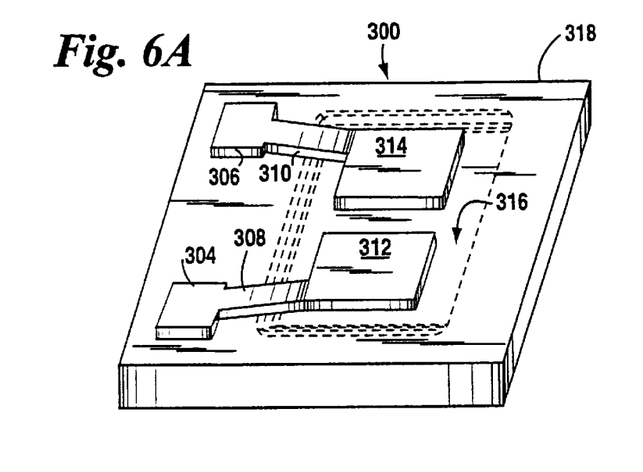
FIGS. 6A and 6B show an example of a coupled-dual resonator inverted mesa crystal whose fundamental mode operates at high frequencies.
Figure 6B:
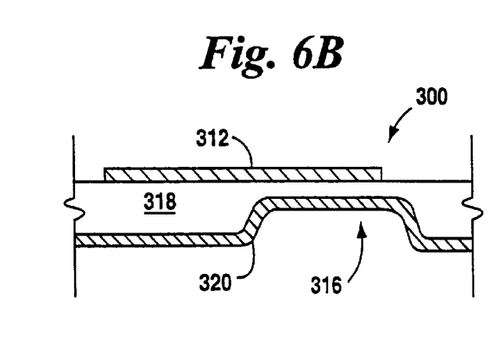
Figure 6C:
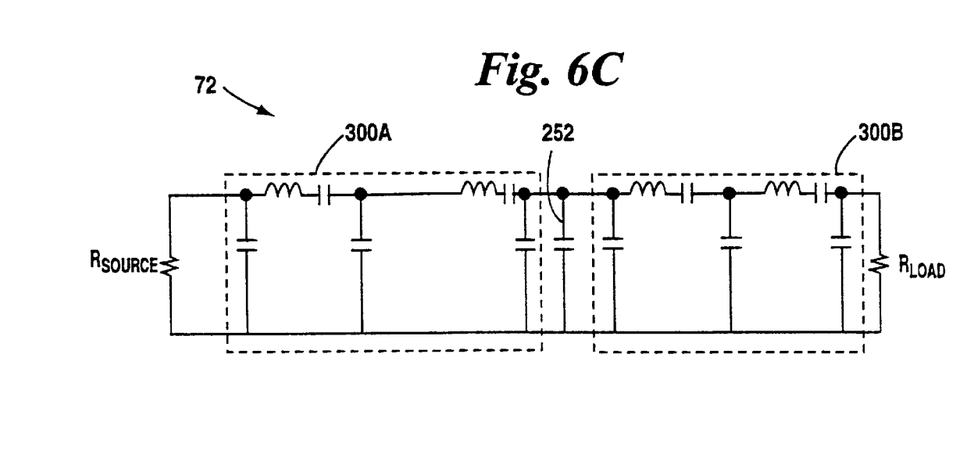
FIG. 6C shows an example high frequency 4-pole crystal filter for use as a first intermediate frequency crystal filter in the FIG. 4 radio.

FIGS. 6A and 6B show an example of one type of inverted mesa high frequency fundamental mode coupled-dual resonator crystal 300 for use in the 4-pole monolithic crystal filter of the FIG. 4 receive IF filter 74. Crystal 300 includes a pair of active electrodes 312, 314 disposed within a common ultra thin vibration area portion 316 of a crystal wafer 318. Bonding pads 304, 306 are coupled by electrode leads 308, 310 to active electrodes 312, 314. Normally the bonding pads 304, 306 of this coupled dual resonator crystal 300 are connected to the input and output connectors of the particular crystal holder used (not shown) and the grounding electrode 320 (on the other side of wafer 318—see FIG. 6B cross-sectional view) is connected to the ground connector of the holder. An equivalent circuit schematic for a 4-pole monolithic crystal filter using two of these coupled-dual inverted mesa crystals 300A, 300B is shown in FIG. 6C. In this particular FIG. 6C example, a first coupled dual resonator crystal 300A is coupled by a shunt coupling capacitor 252 to a second coupled dual resonator crystal 300B. The resulting four-pole monolithic crystal filter 72 has excellent selectivity at a relatively high frequency and yet achieves a high degree of compactness and ruggedness.

In this example, final channel filtering in the receiver is done at the 450 KHz second IF frequency by a novel configuration 74 of ceramic filters. For 25 KHz channel spacing, two wider band ceramic filters 75a, 75b are cascaded to give the required 15 KHz detection bandwidth. When the radio 10 is configured to operate at 12.5 kHz spacing, a third, narrower band ceramic filter 75c is connected to the cascade, resulting in a 9 kHz bandwidth. Two single-pole double-throw broadband electronic switches 74a select the wide filter 75a or the narrow filter 74c. For either channel spacing, total cascaded filter adjacent channel rejection is far in excess of the overall receiver adjacent channel selectivity requirement.

Taken together, the fundamental 124.8 MHz second local oscillator 54 with low phase noise and the high selectivity of the second IF filter cascade 74 and 75 enable nearly all of the adjacent channel selectivity and intermodulation rejection requirements to be allocated to the first local oscillator 78 phase noise performance. That is, we can demand less stringent first local oscillator (78) phase noise requirements because of the very low phase noise provided by the second local oscillator 54. One reason to do this is because the first local oscillator 78, in one example implementation, consists of a wide voltage-controlled oscillator (VCO) (e.g., operating between 527.8–595.25 MHz) that must settle quickly while having to change frequencies over its entire operating band—and is thus relatively noisy. The present invention allows overall high-specification operation to be accomplished with such a VCO by causing the second local oscillator 54 to have the capability of achieving very low phase noise, allowing the first local oscillator 78 to be allocated a phase noise specification that is relatively easy to meet with low cost components.

We have disclosed a novel process for optimizing the frequency plan of a UHF portable radio which results in significant advantages in product realization. The present invention provides advantages that permit a radio design to be realized in a cost effective manner for an array of stringent performance specifications including low spurious output emissions.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A superheterodyne radio transceiver having a predetermined operating frequency range, the radio comprising:

a mixer connected to be responsive to received signals, the mixer converting the received signals to an intermediate frequency based on a local oscillator frequency; and a local oscillator coupled to the mixer, the local oscillator generating the local oscillator frequency such that the ratio of the maximum frequency within the transceiver operating frequency range to the intermediate frequency is substantially minimized, whereby said local oscillator frequency is controlled to place an inherent third order harmonic thereof on one side of the transceiver predetermined operating frequency range and to place an inherent fourth order harmonic thereof on another side of the transceiver predetermined operating frequency range and to leave sufficient frequency spacing between said third and fourth harmonics and the predetermined operating frequency range.

2. A radio transceiver as in claim 1 wherein the ratio is less than 4.

3. A radio transceiver as in claim 1 wherein the ratio is on the order of 3.75.

4. A radio transceiver as in claim 1 wherein the limited operating 2 frequency range is in the UHF band.

5. A radio transceiver as in claim 1 wherein the limited operating frequency range is in the neighborhood of 400 MHz.

6. A portable superheterodyne UHF radio transceiver having a predetermined operating frequency range, the portable radio comprising:
   an antenna that receives and radiates radio signals;
   at least one local oscillator providing an output frequency; and
   a mixer connected to be responsive to signals received by the antenna, the mixer converting the received signals to an intermediate frequency based on a local oscillator output frequency;
   wherein the local oscillator frequency is set to substantially minimize the ratio of the maximum frequency within the transceiver operating frequency range to the intermediate frequency,
   wherein the transceiver further includes a synthesizer fixed frequency reference oscillator, and the local oscillator frequency is placed exactly between adjacent harmonics of the synthesizer fixed frequency of the reference oscillator.

7. A portable transceiver as in claim 6 wherein the operating frequency range includes at least some frequencies between 400 MHz and 500 MHz.

8. A portable transceiver as in claim 6 wherein the local oscillator comprises a second receive local oscillator that is also used to generate a transmit output frequency.

9. A portable transceiver as in claim 6 wherein the local oscillator includes a fixed frequency crystal operating in its fundamental mode at a frequency in excess of 100 MHz.

10. A portable transceiver as in claim 6 wherein the local oscillator includes a high frequency inverted mesa crystal operating in its fundamental mode.

11. A portable transceiver as in claim 6 wherein the third and fourth harmonics of the local oscillator frequency straddle the transceiver operating frequency range.

12. A portable transceiver as in claim 6 further including a fundamental crystal intermediate frequency filter operating at a frequency in excess of 100 MHz.

13. A portable transceiver as in claim 6 wherein the transceiver includes a fixed local oscillator and a variable local oscillator, the fixed local oscillator being controlled by a crystal exhibiting low phase noise, and wherein the low phase noise requirements of the variable local oscillator are decreased based on the low phase noise exhibited by the fixed local oscillator.

14. A portable transceiver as in claim 6 further including a front end RF image filter implemented using low cost small standard LC elements.

15. A portable transceiver as in claim 6 further including an intermediate frequency image filter employing lumped element filters.

16. A portable transceiver as in claim 6 further including an intermediate frequency filter providing selectively programmable bandwidth based on channelization.

17. A portable superheterodyne UHF transceiver having a predetermined operating frequency range, the portable radio comprising:
    an antenna that receives and radiates radio signals;
    at least one local oscillator providing an output frequency; and
    a mixer connected to be responsive to signals received by the antenna, the mixer converting the received signals to an intermediate frequency based on a local oscillator output frequency;
    wherein the local oscillator frequency is set to substantially minimize the ratio of the maximum frequency within the transceiver operating frequency range to the intermediate frequency,
    said portable radio further including a four-pole fundamental crystal intermediate frequency filter comprised of two coupled-dual inverted mesa crystals coupled together by a shunt capacitance.

18. A method of developing a frequency plan for a superheterodyne radio transceiver having a predetermined operating frequency range and at least one intermediate frequency to which received signals are converted through use of a local oscillator frequency, said method comprising:
    (a) determining a low value for the ratio of the maximum frequency within the transceiver operating frequency range to the intermediate frequency; and
    (b) adjusting the low value to minimize spurious outputs and/or the effects of inherently present major harmonics, including controlling said local oscillator frequency to place an inherent third order harmonic thereof on one side of the transceiver predetermined operating frequency range and to place an inherent fourth order harmonic thereof on another side of the transceiver predetermined operating frequency range and to leave sufficient frequency spacing between said third and fourth harmonics and the predetermined operating frequency range.

19. A method of developing a frequency plan for a superheterodyne double conversion UHF radio transceiver having first and second local oscillators and first and second intermediate frequencies, at least one of said first and second local oscillators being driven by a reference oscillator, said transceiver operating over a wideband UHF RF bandpass F1 to F2, said method comprising:
    (a) selecting an approximate second local oscillator frequency to space Its harmonics away from the RF bandpass F1 to F2;
    (b) adjusting the selected second local oscillator frequency for the reference oscillator frequency;
    (c) choosing the second IF frequency;
    (d) choosing the first IF frequency as the sum of the second IF frequency chosen by step (c) and the second local oscillator frequency adjusted by step (b);
    (e) deriving a substantially minimum value for the ratio of F2 to the first IF frequency.

20. A method as in claim 19 wherein step (b) comprises setting the second local oscillator frequency to be equal to the product of the reference frequency and the closest integer value to the sum of F1 and F2 divided by the sum of the numbers of two predetermined harmonics, multiplied by the reference frequency, to which ½ is added.

21. A method as in claim 20 wherein the two predetermined harmonics are the third and fourth harmonics, such that the sum of the numbers of the two predetermined harmonics is seven.

* * * * *